United States Patent [19]

Kleinwächter et al.

[11] Patent Number: 5,337,562
[45] Date of Patent: Aug. 16, 1994

[54] STIRLING ENGINE

[75] Inventors: Hans Kleinwächter, Lörrach; Jürgen Kleinwächter, Kandern; Eckhart Weber, Nürnberg, all of Fed. Rep. of Germany

[73] Assignee: Bomin Solar GmbH & Co. KG, Lorrach, Fed. Rep. of Germany

[21] Appl. No.: 784,418

[22] PCT Filed: Apr. 25, 1991

[86] PCT No.: PCT/DE91/00340
§ 371 Date: Feb. 3, 1992
§ 102(e) Date: Feb. 3, 1992

[87] PCT Pub. No.: WO91/17352
PCT Pub. Date: Nov. 14, 1991

[30] Foreign Application Priority Data

Apr. 27, 1990 [DE] Fed. Rep. of Germany ....... 4013602

[51] Int. Cl.$^5$ ................................................ F02G 1/04
[52] U.S. Cl. .......................................... 60/519; 60/525; 60/526; 60/641.8
[58] Field of Search ................ 60/517, 519, 526, 525, 60/641.8

[56] References Cited

U.S. PATENT DOCUMENTS 4,312,181  1/1982  Clark ..................................... 60/519
4,444,011  4/1984  Kolin ................................... 60/526 X Primary Examiner—Stephen F. Husar
Attorney, Agent, or Firm—James Creighton Wray

[57] ABSTRACT

In a Stirling engine having a housing chamber (1) which is divided by a reciprocating gas-permeable regenerator plate (4) into two part chambers (6, 7), of which one can be heated and the second is provided with cooling (13), the second part chamber (7) communicating with a working cylinder which acts on a working shaft (14) or a flywheel mass (10) via a first drive device (9) and on the regenerator plate (4) via a second drive device, it is proposed to design the housing chamber (1) in a wedge-shape and to mount the regenerator plate (4) pivotably about a pivoting axis (5) in the tip of the housing chamber. As a result of the proposed design of the housing chamber (1) with the pivotable fixing of the regenerator plate (4) which at the same time serves as a displacement piston, the displacement function of the regenerator plate (4) is fully effected by low-wear pivoting motion about the pivoting axis (5).

7 Claims, 2 Drawing Sheets

STIRLING ENGINE

BACKGROUND OF THE INVENTION

The invention relates to a Stirling engine having a housing chamber which is divided by a reciprocating gas-permeable regenerator plate into two part chambers, of which one can be heated and the second is provided with cooling, the second part chamber communicating with a working cylinder which acts on a working shaft via a first drive device and on the regenerator plate via a second drive device. Furthermore, the invention relates to a method for operating Stirling engines.

In a known Stirling engine of this type (publication "19th Intersociety Energy Conversion Engineering Conference", August 1984, pages 1807–1812), the heat-releasing sheet metal wall and the heat-absorbing sheet metal wall are each designed in the shape of flat plates. The rim edges are Joined via an allround side wall, so that a rectangular housing is present. The regenerator plate is a rigid solid body, whose rim edges likewise reciprocate between the sheet metal walls. The connection of the working cylinder to the housing chamber is provided in the region of the side wall. The known Stirling engine is a small laboratory model. With a larger type of construction, for use in practice, considerable difficulties arise. Since, even at a sheet metal size of 1 $m^2$ and a compression of 1:1.05, a force of 500 kp presses the sheet metal walls apart, an expensive heavy support structure for the flat, rigid sheet metal walls is necessary- The guidance of the regenerator plate serving as a displacement piston also proves to be relatively expensive and leads to a significant increase in the cost of such a Stirling engine which, in fact, is intended to be distinguished by simplicity and hence by inexpensive manufacture even in relatively large numbers.

SUMMARY OF THE INVENTION

Accordingly, it is the object of the invention to develop a Stirling engine of the type described at the outset, which is distinguished by a high pressure stability, by easy mobility of the regenerator plate working as a displacement piston and thus by particularly inexpensive manufacture coupled with long service lives.

According to the invention, this object is achieved when the housing chamber is of wedge-shaped design and the regenerator plate is mounted pivotably in the tip of the housing chamber.

As a result of the geometrical design, according to the invention, of the housing chamber with the pivotable fixing of the regenerator plate in the tip of the housing chamber, problems with the guidance and mounting of the moving regenerator plate can be simply and completely prevented. The regenerator plate pivots with little wear about a single pivoting axis and thus moves the working gas, which as a rule is air, present in the housing chamber to and fro between the two part chambers, depending on the corresponding working phase.

A particularly stable engine configuration, which is particularly important in the case of units of higher power, can be obtained when, according to a further feature of the invention, the regenerator plate itself and the two boundary walls of the housing chamber, which are located opposite the former, are designed in the shape of cylinder segments, the curvatures of the boundary walls and of the regenerator plate being mutually matched. As has been found in a first prototype, this geometry allows relatively large pressure differences between the housing chamber and the surroundings, with a relatively small cost of material.

By means of the invention, it is thus possible to produce a Stirling engine which is distinguished by being simple to manufacture, by low maintenance and, relative to the achievable power, by a low materials cost. Such an engine, in which the heat required for operation, that is to say for heating the working gas, can be coupled directly or else indirectly into the corresponding part chamber of the housing chamber, is particularly suitable in non-industrialised regions of high insolation, for example as a drive for water pumps, compressed-air generators for divers, pressure-driven boats on inland lakes or also for introducing oxygen into dead waters. It can also be used as a pump for the irrigation of, for example, allotments or also for operating fountains or as a pump drive in solar hot-water systems.

If solar energy is utilised, a substantial improvement in the efficiency can be obtained when, according to a further feature of the invention, the boundary wall of the heatable part chamber consists of a transparent material and the regenerator surface opposite thereto is provided with a gas-permeable light absorber. The arrangement allows the coupling of the required solar energy directly into the part chamber, which is to be heated, of the working housing and the direct release of the solar heat, taken up by the absorber, to the working gas. Heat transfer surfaces, which reduce the efficiency, are no longer necessary in the case of such a further development.

An additional increase in the efficiency of the Stirling engine can be obtained, according to a further feature of the invention, by the use of a volumetric light absorber which allows energy absorption in the depth and consists, for example, of a netting of different mesh width arranged in several layers.

The cooling of the second part chamber of the housing chamber of the Stirling engine according to the invention can be achieved simply and effectively by a cooling system which is applied directly to the corresponding regenerator surface and oscillates with the regenerator. Owing to the relatively low frequencies, such an arrangement does not cause any problems. A hose system or pipe system bearing a water flow can be used in a simple manner for cooling.

Although the available power of the Stirling engine can in principle be achieved by simply enlarging, for example, the width of the housing chamber, it is advantageous to combine two or more Stirling engines in the manner of modules to give a drive unit, all the individual modules of the drive unit acting on a con, non working shaft. If the individual modules are coupled with a phase shift by the amount of $2\pi/n$ (n=number of modules) relative to each of the preceding and following modules in the working cycle, even revolution of the working shaft is achieved. The flywheel mass required in the case of a single machine can be omitted or, at least, be substantially reduced.

Furthermore, if a plurality of modules act on a common working shaft, it is possible to operate individual modules in a manner known per se as a refrigeration machine, if the boundary wall associated with the usually heated part chamber is screened from irradiation by heat or light.

BRIEF DESCRIPTION OF THE DRAWINGS

Further explanations regarding the invention are to be found in the illustrative example diagrammatically shown in FIGS. 1 to 6.

Figure 2:
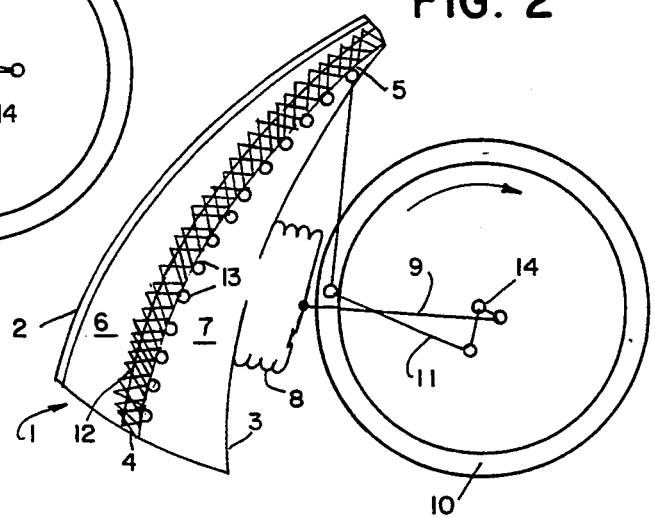

For an explanation of the structure of a Stirling engine according to the invention, reference is made in particular to FIG. 2. The Stirling engine shown consists of a wedge-shaped housing chamber 1 with boundary walls 2 and 3 which are designed in the shape of cylinder segments in order to increase the strength. Inside the housing chamber 1, a regenerator plate 4 is provided which is likewise designed in the shape of a cylinder segment and which is mounted about a pivoting axis 5 in the tip of the housing chamber. In the housing chamber 1, the regenerator plate 4 forms two part chambers 6 and 7, the heating of the working gas, which is air in the present case and which moves to and fro through the regenerator plate 4, taking place in the part chamber 6 and the required cooling taking place in the part chamber 7. The part chamber 7 communicates with a working cylinder which is formed by a membrane 8 and which in turn is connected via a linkage 9 to a working shaft 14. In addition, the working shaft 14 is connected to the regenerator plate 4 via a second linkage 11.

Since solar heat is to be utilised in the present case, the boundary wall 2 is made of a transparent material. An improvement in efficiency can be achieved if a doubly transparent cover is used which allows the rays of light to penetrate unhindered into the part chamber 6 but prevents outward radiation of heat. The air-permeable light absorber 12 is arranged on the regenerator plate 4 to cover the whole surface. Cooling is effected by a water-bearing hose system 13 which is fixed on the opposite side of the regenerator plate 4 and oscillates with the latter in accordance with the working phase of the engine.

Figure 1:
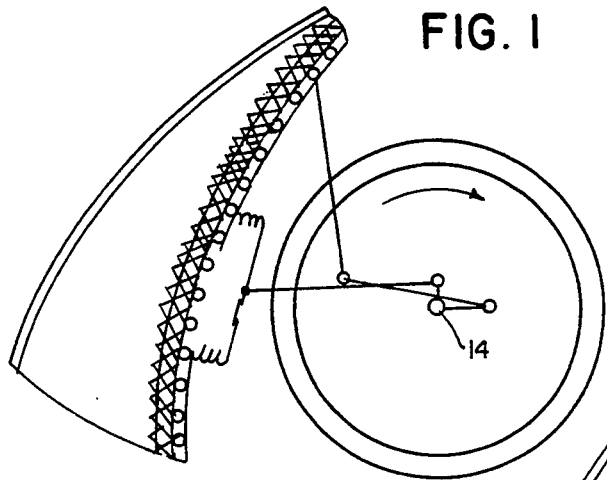
FIGS. 1-4 are schematic representations of an engine with chambers, a flywheel and linkage in varied cycle positions.

In the operation of the engine, the resulting working sequence is as follows: at the minimum volume of the part chamber 7, that is to say the regenerator plate 4 is pivoted directly in front of the boundary wall all the working air is in the hot part chamber 6. The pressure in the engine rises, and the membrane 8 expands and, via the linkage 9, drives the working shaft 14 and/or the flywheel 10 (FIG. 1).

As soon as the membrane 8 has reached its maximum volume, the regenerator plate 4 swings in the direction of the boundary wall 2. The hot air then flows through the regenerator plate and releases its heat to the storage medium of the plate, whereby the pressure in the engine housing falls (FIG. 2).

The flywheel 10 then compresses the membrane 8 via the linkage 9, the air in the housing being compressed. The arising heat of compression is released to the cooling system 13. At the same time, the regenerator plate 4 pivots by means of the linkage 11 in the direction of the boundary wall 2.

Figure 3:
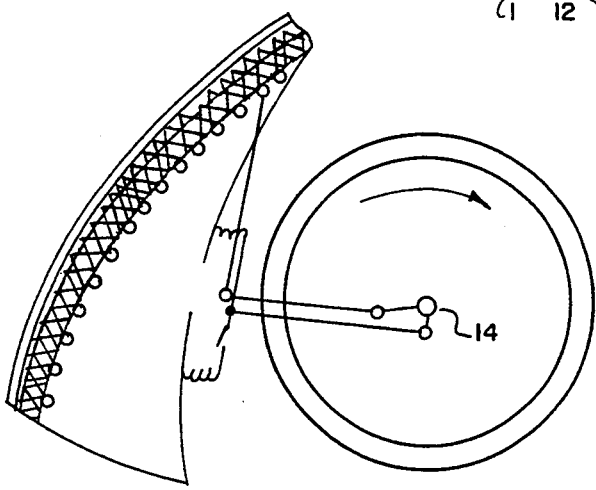
Figure 4:
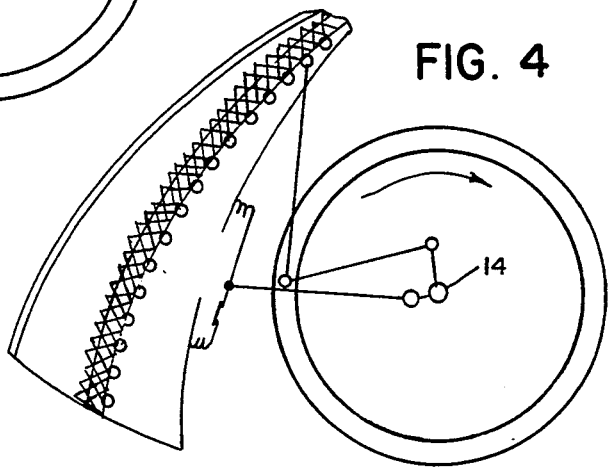

As soon as the bottom dead centre of the membrane 8 has been reached, the regenerator plate pivots back in the direction of the boundary wall 3 (FIG. 3). At this time, the displaced air absorbs both the heat stored in the plate 4 and the solar heat supplied from the outside. This leads to a pressure increase in the housing and hence to renewed expansion of the membrane 8 (FIG. 4).

Figure 5:
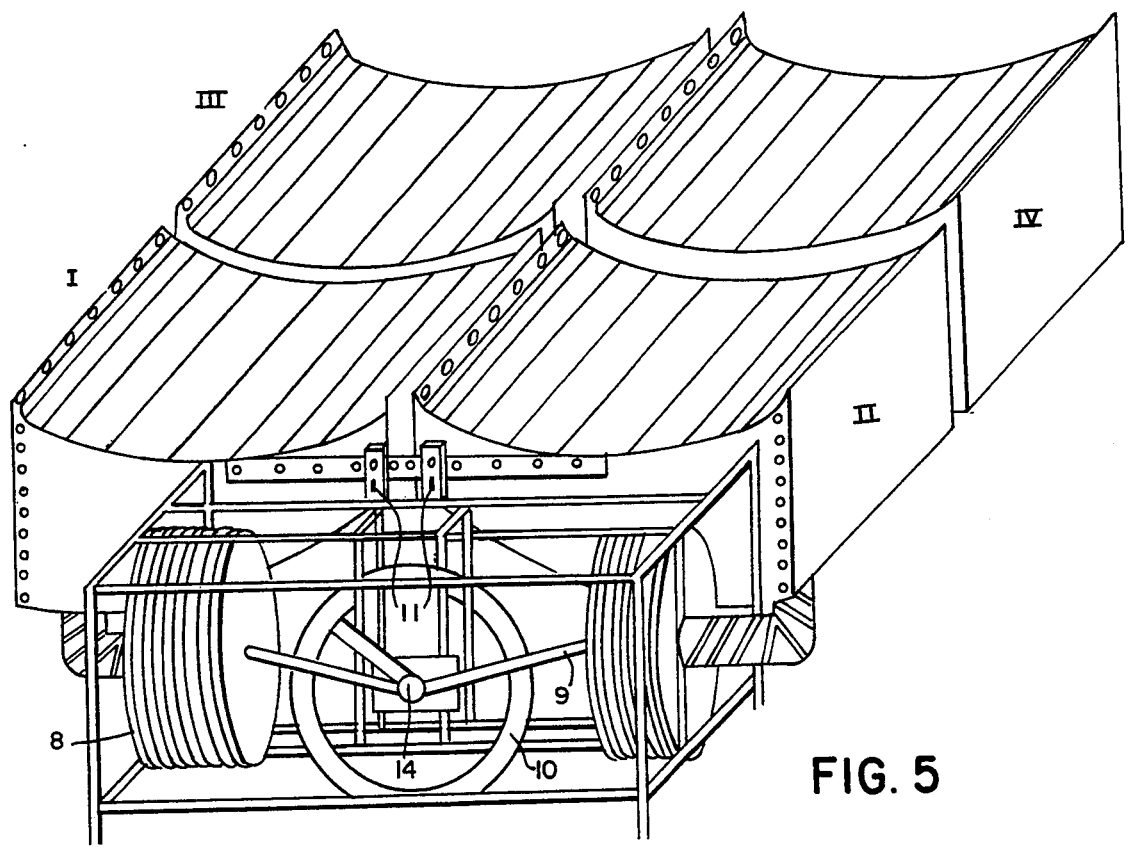
FIG. 5 is a schematic representation of a drive with multiple modules.

FIG. 5 shows a drive unit consisting, in the example, of 4 single modules I to IV and, in particular, the modules in this example are arranged horizontally. Of course, the individual modules can also be arranged in a row side by side, but it is advantageous to form a drive unit from pairs of modules, as in the example shown.

Figure 6:
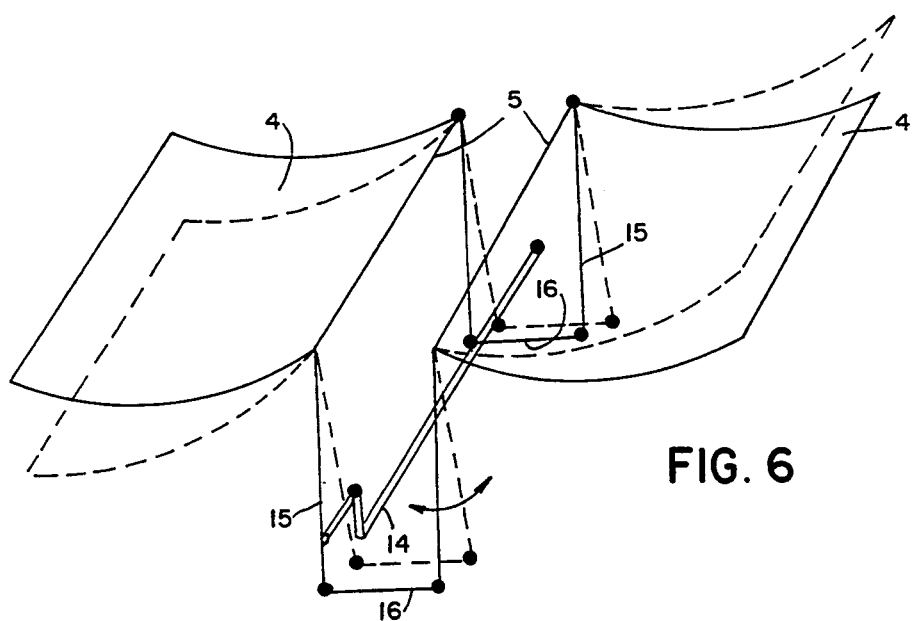
FIG. 6 shows an advantageous arrangement of modules.

In this case, the individual modules of one pair of modules in each case are advantageously arranged, as shown in FIG. 6, in such a way that the pivoting axes (5) of the regenerator plates (4) are located side by side in parallel and the pivoting motions of the pivoting axes (5) are turned by the working shaft (14), in the same direction in each case, via parallelogram linkages (15, 16 to 15', 16') acting on the ends of the pivoting axes outside the housing chambers (1). As a result, with horizontal arrangement of the modules, the regenerator plate (4) of one module is lowered and at the same time the regenerator plate (4) of the second module is lifted. Thus, a weight balance follows automatically in each pair of modules, without the counter weights otherwise required.

With such a drive unit consisting of a plurality of modules, it is possible to operate one module or individual modules in a manner known per se as a refrigeration machine. For this purpose, it is necessary merely to screen the part chamber 6 of the corresponding module from heat and/or insolation.

We claim:

1. A stirling engine having a housing chamber divided by a reciprocating gas-permeable regenerator plate into two part chambers, of which one can be heated and the second has cooling, the second part chamber communicating with a working cylinder which acts on a working shaft via a first drive device and on the regenerator plate via a second drive device, wherein the housing chamber (1) is of wedge-shaped design and the regenerator plate (4) is mounted pivotably about a pivoting axis (5) in the tip of the housing chamber, characterized in that the regenerator plate (4) and the two boundary walls (2, 3) of the housing chamber (1), which are located opposite the former, are designed in the shape of cylinder segments, the curvatures of the boundary walls (2, 3) and of the regenerator plate (4) being mutually matched.

2. A stirling engine having a housing chamber divided by a reciprocating gas-permeable regenerator plate into two part chambers, of which one can be heated and the second has cooling, the second part chamber communicating with a working cylinder which acts on a working shaft via a first drive device and on the regenerator plate via a second drive device, wherein the housing chamber (1) is of wedge-shaped design and the regenerator plate (4) is mounted pivotably about a pivoting axis (5) in the tip of the housing chamber, characterized in that the boundary wall (2) of the heatable part chamber (6) consists of a transparent material and the regenerator surface opposite thereto is provided with a gas-permeable light absorber (12).

3. Stirling engine according to claim 2, characterised in that the light absorber (12) is designed as a volumetric absorber.

4. A stirling engine having a housing chamber divided by a reciprocating gas-permeable regenerator plate into two part chambers, of which one can be heated and the second has cooling, the second part chamber communicating with a working cylinder which acts on a working shaft via a first drive device and on the regenerator plate via a second drive device, wherein the housing chamber (1) is of wedge-shaped design and the regenerator plate (4) is mounted pivotably about a pivoting axis (5) in the tip of the housing chamber, characterized in that the regenerator surface facing the second part chamber is designed so that it can be cooled (13).

5. Apparatus for operating Stirling engines according to claim 4, characterised in that a plurality of Stirling engines (I, II, III, IV) act on a common working shaft (14).

6. Apparatus according to claim 5, characterised in that two Stirling engines in each case are arranged relative to one another in such a way that the pivoting axes (5) of each of the regenerator plates (4) are located side by side in parallel and the pivoting motions of the pivoting axes (5) are turned by the working shaft (14), in the same direction in each case, via parallelogram linkages (15, 16) and (15', 16') acting on the ends of the pivoting axes outside the housing chambers (1).

7. Apparatus according to claim 5, characterised in that at least one of the Stirling engines (I, II, III, IV) acting on the common working shaft (14) is operated as a refrigeration machine.

* * * * *